United States Patent

[11] 3,619,805

| [72] | Inventor | Stephen F. Bean<br>Worthington, Ohio |
|---|---|---|
| [21] | Appl. No. | 790,011 |
| [22] | Filed | Jan. 9, 1969 |
| [45] | Patented | Nov. 9, 1971 |
| [73] | Assignee | Reliance Electric and Engineering Company<br>Columbus, Ohio |

[54] NONCONTACTING DISPLACEMENT TRANSDUCER INCLUDING AN OSCILLATOR WITH CABLE-CONNECTED INDUCTIVE PROBE
14 Claims, 3 Drawing Figs.

[52] U.S. Cl. .................................................. 331/65,
324/41, 331/109, 331/117 R, 340/258 C
[51] Int. Cl. .................................................. C01r 33/12,
H03b 3/02
[50] Field of Search .......................................... 331/65, 117
R, 109, 182; 324/40, 41; 340/38 L, 258 C, 266

[56] References Cited
UNITED STATES PATENTS

| 2,819,447 | 1/1958 | Harmon | 331/65 X |
| 3,312,935 | 4/1967 | Brothman et al. | 331/65 |
| 3,350,660 | 10/1967 | Engdahl et al. | 331/65 |
| 3,397,364 | 8/1968 | Crandall | 331/65 |
| 3,461,400 | 8/1969 | Koda | 331/65 |
| 3,521,158 | 7/1970 | Morrow et al. | 331/65 X |

Primary Examiner—Roy Lake
Assistant Examiner—Siegfried H. Grimm
Attorney—LeBlanc & Shur ABSTRACT: Disclosed is an eddy-current-type noncontacting displacement transducer and gage for gaging the distance between a probe tip and a metallic surface. The transducer comprises a modified common base transistor oscillator incorporating the probe coil as the oscillator resonant circuit. The base is unbypassed to increase linearity and operation at low frequency, i.e. 25 kHz. reduces capacitive sensitivity so that the transducer may be used with long cables.

PATENTED NOV 9 1971 3,619,805

| MILS STANDOFF | SLOPE mV/MIL | %DEV |
|---|---|---|
| 20 | 36 | 0 |
| 40 | 36 | 0 |
| 60 | 36 | 0 |
| 80 | 36 | 0 |
| 100 | 36 | 0 |
| 120 | 34 | -5.5 |
| 140 | 31 | -13.9 |
| 160 | 27 | -25. |
| 180 | 25 | -35.5 |
| 200 | 19 | -47.7 |
| 220 | 5 | -86. |
| 240 | 3 | -91.5 |

INVENTOR
STEPHEN F. BEAN
BY LeBlanc & Shur
ATTORNEYS

NONCONTACTING DISPLACEMENT TRANSDUCER INCLUDING AN OSCILLATOR WITH CABLE-CONNECTED INDUCTIVE PROBE

This invention relates to a noncontacting displacement transducer which utilizes an eddy current effect to gage the distance between a probe tip and a metallic surface. More particularly, it relates to a noncontacting displacement transducer which is substantially insensitive to capacitance variations and may be used with relative long cables.

Noncontacting displacement gages and transducers are well known and are used in a variety of applications, such as to measure the static position of a shaft in a machine, to determine the size of a part, or to measure shaft vibration. However, for the most part, these prior devices have operated at a relatively high frequency so that the oscillator-sensing coil combination is capacitive sensitive. That is, the probe in prior constructions will detect changes in permittivity of the medium between the probe and the surface being sensed. In addition, the known gages are sensitive to cable capacitance and generally have been limited to use with a cable having a maximum length of about 30 feet.

The present invention avoids these and other difficulties by providing an eddy current transducer in which the transducer probe forms the tank circuit in a common base oscillator operating at a relative low frequency, i.e., near 25 kHz. As the probe approaches a metal object, the "Q" of the probe changes. The output voltage of the oscillator is proportional to the impedance in the collector circuit of the oscillator transistor. A change in Q of the pickup corresponds to a change in the resistive component of the coil impedance ($Q=WL/R$) which causes a change in the output voltage on the collector of the oscillator transistor. The oscillator output is rectified to produce an output signal for the transducer which is a DC voltage that is a linear function of the distance from the probe tip to the metallic surface.

This novel construction makes possible use of the transducer with a very long cable from the probe to the oscillator, i.e., as much as 250 feet in length and longer. The transducer evidences a relatively large standoff range (150 mils), a linear transfer characteristic (1 percent over range), excellent temperature stability when the probe is heated to as much as 300° F. (2 percent), and excellent DC stability (1 percent). The probe can be used to measure the static position of the end of a shaft in a machine, to determine the size of a part in a fixture, or to measure the radial vibration of a shaft in a machine. When measuring the vibration of an object, the output can be AC coupled with a capacitor and the amplitude of the vibrational signal is independent of the distance between the probe tip and the reference surface over the entire 150 mil-inch range of the probe.

It is therefore one object of the present invention to provide an improved noncontacting displacement transducer.

Another object of the present invention is to provide an improved eddy-current-type displacement transducer.

Another object of the present invention is to provide a noncontacting displacement transducer and gage having increased insensitivity to capacitance variations and usable with cables of significantly increased length.

Another object of the present invention is to provide an improved noncontacting displacement transducer having a large standoff range, increased linearity and excellent stability.

Another object of the present invention is to provide an improved eddy-current-type displacement transducer in which the coil probe forms the tank circuit of a modified common base oscillator operating at relative low frequencies, i.e., in the kiloHertz range.

These and further objects and advantages of the invention will be more apparent upon reference to the following specification, claims, and appended drawings, wherein:

Figure 1:
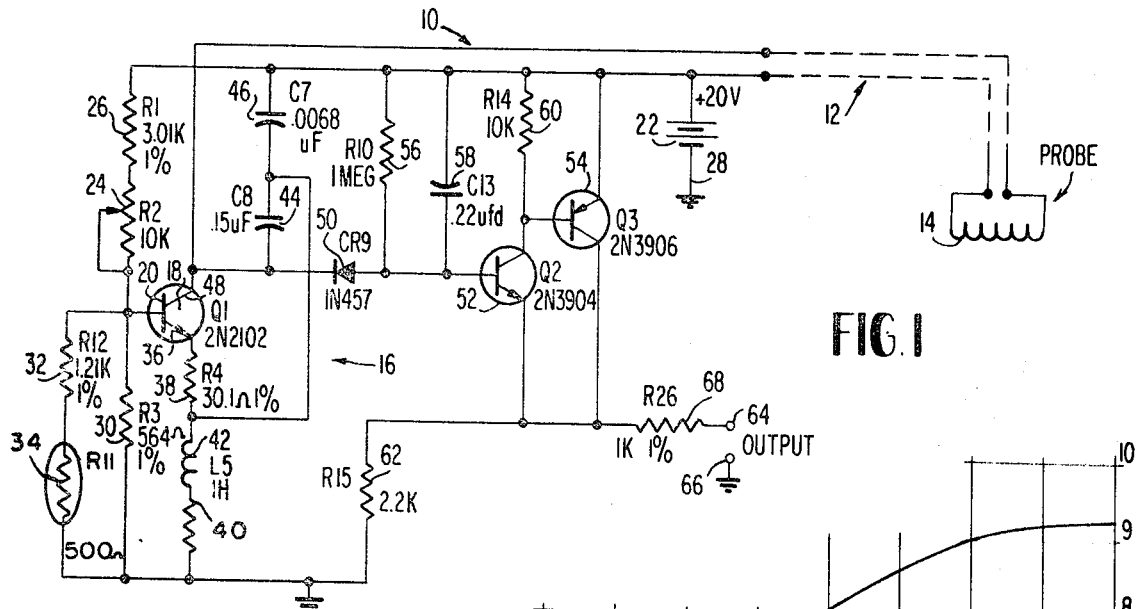
FIG. 1 is a circuit diagram of the improved noncontacting displacement transducer of the present invention.

Referring to the drawings, the novel transducer of the present invention is generally illustrated at 10 in FIG. 1 and is connected by a relatively long cable indicated by dashed lines at 12 to an eddy-current-type probe of conventional construction comprising a sensing coil 14. An important feature of the present invention includes the fact that it is possible to connect the probe 14 to the transducer 10 by a long cable 12 having a length of as much as 300 feet.

Probe coil 14 preferably has a relatively high Q and a relatively low resistance. In the preferred embodiment, it takes the form of a coil wound with 500 turns of No. 32 Mylar insulated coil wire layer wound in six layers. The inductance of the probe is 8.2 millihenries when it is away from a metal surface. The inductance changes to 6.75 millihenries when the probe is in contact with a 4140 stainless steel shaft. The inductance test was performed at 25 kHz. which is the preferred operating frequency of the transducer 10.

Transducer 10 comprises an oscillator generally indicated at 16 including a transistor 18 labeled $Q_1$ in FIG. 1. Transistor 18 is a conventional NPN-junction transistor and has its base 20 connected to the positive side of a +20-volt power supply indicated by the battery 22 through a variable resistor 24 and a fixed resistor 26. The negative side of the power supply is connected to ground as indicated at 28 and the base 20 of the transistor is returned to ground through a fixed resistor 30. Resistors 24, 26 and 30 form the base biasing network for oscillator transistor 18. Resistor 30 is shunted by a fixed resistor 32 and a Fenwal thermistor 34, the latter providing temperature compensation for the oscillator.

Connected to the emitter 36 of transistor 18 are a pair of resistors 38 and 40 in series with a choke coil 42. Resistor 38 is provided to give a higher input impedance for the feedback path around transistor 18. It is selected for the best linearity. Coil 42 forms a choke that looks like a high impedance to the AC feedback signal (greater than 50 kiloohms). Resistor 40 is the emitter biasing resistor for the transistor.

Capacitors 44 and 46 are connected between the collector 48 of the transistor and the positive side of the power supply and these capacitors form a capacitive voltage divider for the feedback signal to resistor 38. Probe 14 is connected between collector 48 of the transistor and the positive side of the power supply and forms the tank circuit for the oscillator of which the transistor 18 is a part.

The transducer probe is the tank circuit for the oscillator which bears some resemblance to a Colpitts common base oscillator. It is, in fact, a modified common base oscillator because the base is not bypassed with a large capacitor. The unbypassed base 20 adds degeneration to the circuit which makes the transfer characteristic more linear. The oscillator is designed to operate in the low frequency range and preferably at or near 25 kHz. As the probe approaches a metal object, the Q of the probe changes. The output voltage of the oscillator is proportional to the impedance in the collector circuit of transistor 18, that is, the impedance connected to collector 48. A change in the Q of the pickup or probe 14 corresponds to a change in the resistive component of the coil impedance ($Q=WL/R$) which causes a change in the output voltage on collector 48 of the transistor. The oscillator runs at a frequency $f_o$ determined as follows:

$$f_o = \frac{1}{2\pi\sqrt{L_{probe}\left(\frac{C_7 C_8}{C_7 + C_8}\right)}}$$

Collector 48 of transistor 18 is connected through a rectifier diode 50 to a bootstrap emitter follower comprising conventional junction transistors 52 and 54 labeled $Q_2$ and $Q_3$ respectively. Diode 50, in conjunction with resistor 56 and capacitor 58, forms a halfwave rectifier or demodulator such that halfwave rectification takes place in the diode 50 and the DC value of the halfwave rectified signal is stored on capacitor 58. Bootstrap transistors 52 and 54 are connected to a supply resistor 60 and emitter resistor 62. They form a bootstrap emitter follower which has an input impedance greater than 1 megaohm and an output impedance of less than 0.1 ohm. Finally, an output is developed across resistor 62 at output terminals 64 and 66, one of which is grounded. The DC output signal is developed through a series current limiting resistor 68 which protects the circuit against accidental short circuits and gives a fixed output impedance for the transducer.

Figure 2:
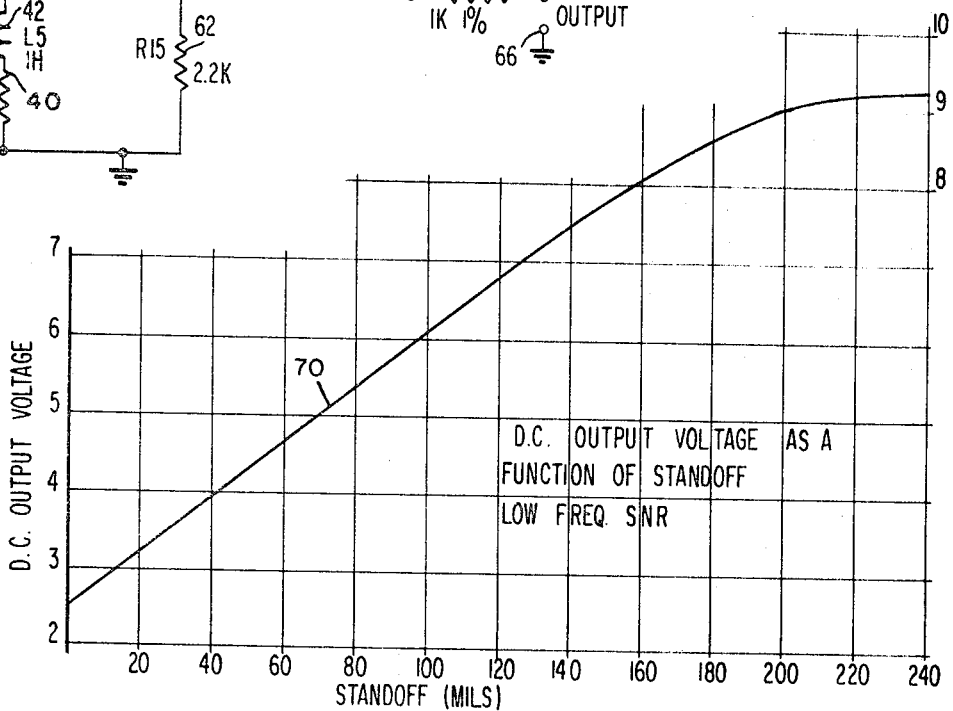
FIG. 2 is a plot of the DC output voltage as a function of standoff distance for the transducer of FIG. 1.
Figure 3:
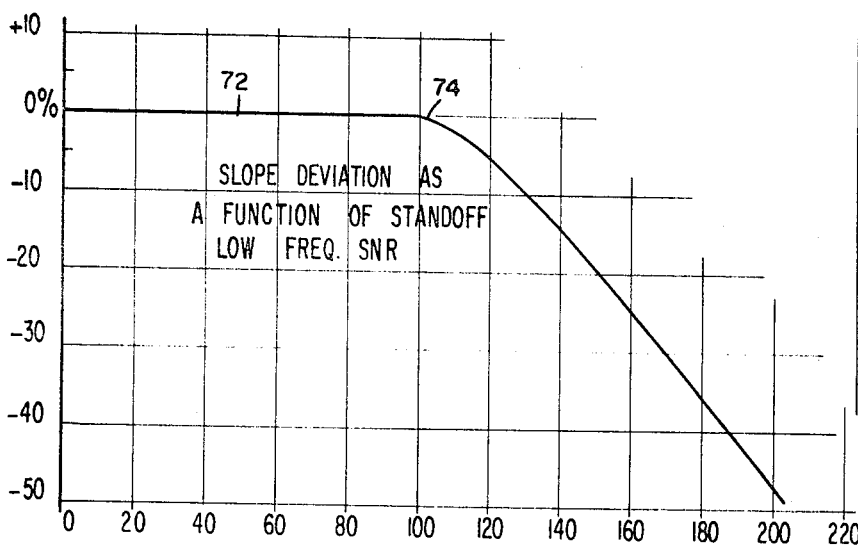
FIG. 3 is a plot of slope deviation (millivolts per mil) as a function of standoff distance for the transducer of FIG. 1.

In order to set up the transducer, variable resistor 24 is adjusted so that the DC output voltage at terminal 64 is −10 volts with respect to the +20-volt line from source 22 when the probe is 75 mils away from a piece of steel. The slope at this point is 150 millivolts per mil from zero standoff to 150 mils. FIG. 2 is a plot of the DC output voltage at terminal 64 of FIG. 1 as a function of standoff distance in mils (thousandths of an inch). As can be seen, the curve 70 in FIG. 2 is substantially linear from zero to a standoff distance of approximately 150 mils. This curve is derived for an operating frequency of 25 kHz. which is the preferred operating frequency for the circuit. FIG. 3 is a corresponding plot of the slope deviation for the circuit of FIG. 1 as a function of standoff distance. The curve 72 in FIG. 3 shows that the slope is substantially constant from zero to over 100 mils and then drops off at 74 at a substantially constant rate. At 140 mils standoff, the slope, i.e., millivolts per mil shows a deviation of −13.9 percent and at 160 mils standoff the slope shows a deviation of approximately −25 percent.

As can be seen, the present invention provides an improved low frequency transducer or probe driver and eddy current gage which permits a substantial increase in the length of cable to the probe over existing constructions. In the present invention, the probe coil forms the tank circuit for a low frequency oscillator having an unbypassed base. By operating at a lower frequency, i.e. below 100 kHz., the capacitive sensitivity of the eddy current transducer is substantially reduced, i.e., cable lengths of up to 200 or 300 feet from the sensing probe to the oscillator may be used since the reactance of the shunt capacitance of the cable is greatly reduced at the lower frequency.

In addition, the transducer of this invention permits a large standoff range by increasing the power level of the oscillator. This is accomplished in the present invention by utilizing a high Q sensing coil and increasing the current through collector 48 of transistor 18. A substantially linear transfer characteristic is achieved by leaving the base 20 of transistor 18 unbypassed which adds negative feedback into the oscillator loop. Probe temperature stability is achieved by using a high Q probe coil. The resistance component of the coil is kept to a minimum by using a large wire. The Q of the sensing probe coil is a function of the inductive reactance and the resistance components of the coil. The resistance is the component that tends to change with temperature so this effect is held to a minimum by keeping the probe resistance to a minimum. DC stability is improved by incorporating a thermistor temperature compensating network, including thermistor 34.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A noncontacting displacement transducer, comprising: a pickup including a coil having an impedance, the resistive component of which varies in relation to the spacing between said pickup and an object under inspection; an oscillator comprising a transistor and a frequency-determining circuit including said pickup coil, means coupled to said transistor to establish a linear relationship between the amplitude of oscillation and the measured displacement, and means coupled to said transistor to provide an output signal quantitatively representative of said amplitude of oscillation.

2. A noncontacting displacement transducer as defined in claim 1 further including temperature-compensating means connected to said transistor to maintain said oscillation amplitude at a constant value independent of ambient temperature variations.

3. A noncontacting displacement transducer as defined in claim 1 wherein the frequency of said oscillator is less than about 100 kHz. and wherein said pickup coil is connected into said frequency determining circuit by a cable at least 30 feet in length.

4. A noncontacting displacement transducer comprising: a pickup including a coil having an impedance, the resistive component of which varies in relation to the spacing between said pickup and an object under inspection: an oscillator comprising a transistor, a frequency-determining circuit including said pickup coil, means coupling said frequency-determining circuit to said transistor to provide regenerative feedback at a predetermined frequency, whereby said oscillator provides an output at said predetermined frequency at an amplitude which is a function of the resistive component of the impedance of said pickup coil, biasing means for said transistor including a purely resistive circuit for coupling the base of said transistor to a power supply whereby said base is unbypassed at the frequency of operation; and means coupled to said transistor to provide an output signal representative of the amplitude of said oscillator output.

5. A noncontacting displacement transducer as defined in claim 4 wherein said frequency-determining circuit comprises a parallel LC circuit including said pickup coil connected across a series combination of first and second capacitors, said coupling means comprising means connecting one side of said parallel circuit to the base of said oscillator transistor, means coupling the other side of said parallel circuit to the collector of said transistor, and means connecting the junction between said first and second capacitors to the emitter of said transistor.

6. A noncontacting displacement transducer as defined in claim 4 wherein said biasing means includes a temperature-sensitive resistive element coupled to the base of said transistor to vary the base bias for said transistor in direct relationship to changes in operating temperature.

7. A noncontacting displacement transducer comprising an eddy current pickup including a coil having an impedance, the resistive component of which varies in accordance with the spacing between said pickup and an object under inspection; a transistor Colpitts-type oscillator; means including said pickup coil forming a resonant circuit for said transistor oscillator, means including said resonant circuit and a purely resistive base bias circuit for said transistor for controlling the amplitude of said oscillator output in relation to the impedance to said pickup coil, whereby the amplitude or said oscillator output is linearly related to said pickup to object spacing.

8. A noncontacting displacement transducer as defined in claim 7 wherein said base bias circuit includes means for varying the bias level as a function of operating temperature.

9. A noncontacting displacement transducer comprising an oscillator including a transistor having a base, an emitter and a collector, a pair of power supply terminals for coupling said transistor to opposite sides of a power supply, first and second capacitors coupled in series between said collector and one of said power supply terminals, feedback means coupling the junction of said capacitors to said emitter, means providing purely resistive coupling between said base and each of said power supply terminals, a biasing resistor coupling said emitter to the other of said power supply terminals, means for coupling a pickup coil between said collector and said one power supply terminal, and means for deriving an electrical output from the collector circuit of said transistor.

10. A transducer according to claim 9 including a choke coil coupled to the emitter of said transistor.

11. A transducer according to claim 9 including a rectifier diode and capacitor coupled to the collector of said transistor for deriving a DC output from said oscillator.

12. A transducer according to claim 9 including an emitter follower coupled to the collector circuit of said transistor.

13. A transducer according to claim 12 wherein said emitter follower comprises a pair of bootstrapped transistors.

14. A transducer according to claim 9 wherein said means for providing purely resistive coupling between said base and said power supply terminals includes a thermistor connected between said base and said other power supply terminal.

* * * * *